United States Patent
Takakuwa

(10) Patent No.: US 10,520,078 B2
(45) Date of Patent: Dec. 31, 2019

(54) SHIFT LEVER DEVICE

(71) Applicant: TOYOTA JIDOSHA KABUSHIKI KAISHA, Toyota-shi, Aichi-ken (JP)

(72) Inventor: Kei Takakuwa, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 269 days.

(21) Appl. No.: 15/372,098

(22) Filed: Dec. 7, 2016

(65) Prior Publication Data

US 2017/0167605 A1 Jun. 15, 2017

(30) Foreign Application Priority Data

Dec. 14, 2015 (JP) ................................ 2015-243057

(51) Int. Cl.
*F16H 59/02* (2006.01)
*F16H 59/10* (2006.01)

(52) U.S. Cl.
CPC ......... *F16H 59/0278* (2013.01); *F16H 59/10* (2013.01); *F16H 2059/0282* (2013.01)

(58) Field of Classification Search
CPC ...... F16H 59/10; F16H 59/12; F16H 59/0278; F16H 2059/0282; F16H 2059/0243
USPC ......... 74/473.3, 523, 527, 537, 538; 267/73, 267/74, 286; 16/414, 421, 430
See application file for complete search history.

(56) References Cited

U.S. PATENT DOCUMENTS

| | | | | |
|---|---|---|---|---|
| 2,476,457 A | * | 7/1949 | Schneider | A63F 7/0076 273/265 |
| 4,755,645 A | * | 7/1988 | Naoki | H01H 13/20 200/276.1 |
| 5,179,870 A | * | 1/1993 | Behrens | B60K 20/02 74/473.23 |
| 5,207,740 A | * | 5/1993 | Ikushima | F16H 59/10 192/220.6 |
| 5,247,849 A | * | 9/1993 | Sato | B60Q 1/1476 200/61.88 |
| 5,575,175 A | * | 11/1996 | Kataumi | F16H 59/10 403/327 |
| 5,759,132 A | * | 6/1998 | Osborn | F16H 59/10 192/220.4 |

(Continued)

FOREIGN PATENT DOCUMENTS

| | | |
|---|---|---|
| CN | 102285315 A | 12/2011 |
| JP | 56-156113 U | 11/1981 |

(Continued)

*Primary Examiner* — Victor L MacArthur
*Assistant Examiner* — T. Scott Fix
(74) *Attorney, Agent, or Firm* — Oliff PLC

(57) ABSTRACT

A shift lever device includes a shift knob, a rod member including a first portion. The rod member is configured to cancel limitations on changes in a shift position by moving in a first direction. And the shift lever device includes a button portion including a second portion configured to engage the first portion and a button top protruding from the shift knob. The button portion is configured to move the rod member in the first direction by moving in a second direction when the first portion and the second portion are in contact with each other. And the shift lever device includes an urging member. The urging member is configured to urge the button portion such that the second portion approaches the first portion.

7 Claims, 11 Drawing Sheets

(56) References Cited

U.S. PATENT DOCUMENTS

| | | | | |
|---|---|---|---|---|
| 6,298,743 | B1* | 10/2001 | Horn | F16H 59/10 |
| | | | | 74/473.3 |
| 6,601,469 | B1* | 8/2003 | Giefer | F16H 59/10 |
| | | | | 74/473.3 |
| 7,913,583 | B2* | 3/2011 | Reppuhn | F16H 59/10 |
| | | | | 74/473.21 |
| 9,435,427 | B2* | 9/2016 | Miyamoto | F16H 59/0278 |
| 2002/0144567 | A1* | 10/2002 | Lee | F16H 59/0278 |
| | | | | 74/523 |
| 2004/0182191 | A1* | 9/2004 | Kondo | F16H 59/0278 |
| | | | | 74/473.3 |
| 2005/0022622 | A1* | 2/2005 | Mitteer | F16H 59/10 |
| | | | | 74/473.3 |
| 2005/0061102 | A1* | 3/2005 | Jarjoura | F16H 59/0278 |
| | | | | 74/523 |
| 2005/0247159 | A1* | 11/2005 | Tomida | F16H 59/0278 |
| | | | | 74/538 |
| 2006/0230858 | A1* | 10/2006 | Kurogane | F16H 59/0278 |
| | | | | 74/473.1 |
| 2008/0000314 | A1* | 1/2008 | Reppuhn | F16H 59/10 |
| | | | | 74/473.21 |
| 2011/0308346 | A1 | 12/2011 | Yamamura | |
| 2012/0137813 | A1* | 6/2012 | Cho | F16H 59/0208 |
| | | | | 74/473.29 |
| 2014/0123798 | A1* | 5/2014 | Miyamoto | F16H 59/0278 |
| | | | | 74/473.3 |
| 2016/0348784 | A1* | 12/2016 | Kato | F16H 59/0278 |

FOREIGN PATENT DOCUMENTS

| | | |
|---|---|---|
| JP | 2000-043600 A | 2/2000 |
| JP | 2006-248479 A | 9/2006 |
| JP | 2012-001111 A | 1/2012 |

* cited by examiner

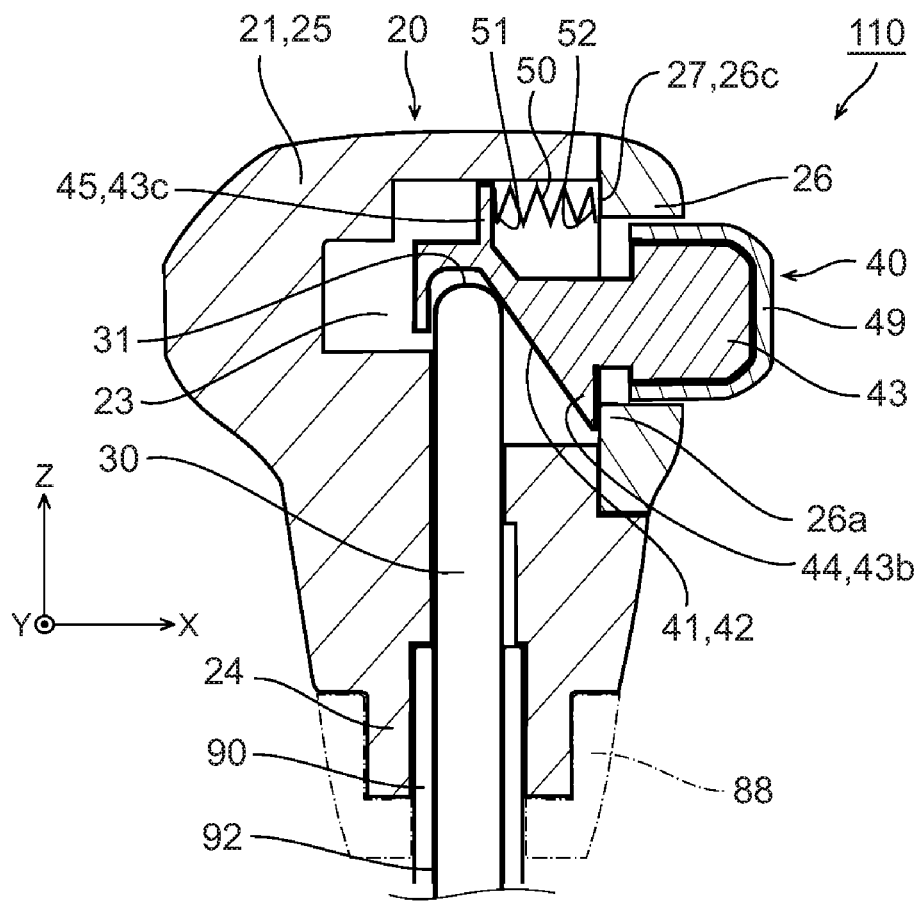

SHIFT LEVER DEVICE

INCORPORATION BY REFERENCE

The disclosure of Japanese Patent Application No. 2015-243057 filed on Dec. 14, 2015 including the specification, drawings and abstract is incorporated herein by reference in its entirety.

BACKGROUND OF THE DISCLOSURE

1. Field of the Disclosure

The disclosure relates to a shift lever device.

2. Description of Related Art

In Japanese Patent Application Publication No. 2000-043600 (JP 2000-043600 A), there is described a shift lever device that is provided with a limitation mechanism for limiting inadvertent changes to a reverse position for reversely driving driving wheels and a parking position for locking the driving wheels.

By the way, the shift lever device described in Japanese Patent Application Publication No. 2000-043600 (JP 2000-043600 A) is equipped with a shift lever that changes a shift position of an automatic transmission through shift operation, a detent rod that avoids detent means, an unlocking button that displaces the detent rod in an avoidance direction upon receiving a pressure force, a sleeve that thrusts back the unlocking button toward a position thereof prior to reception of the pressure force, and a compression coil spring that urges the sleeve. The compression coil spring is configured to thrust back the unlocking button in a direction opposite to the avoidance direction.

That is, this shift lever device is configured to cancel limitations on changes in the shift position, with the aid of the detent rod in the shift lever and a cam that is provided on the unlocking button, by performing an operation of pressing the unlocking button of a shift knob inward. Moreover, the unlocking button is urged in a direction opposite to the direction of the operation of pressing the unlocking button inward, by the spring that is provided in the shift knob. As a result, the cam that is provided on the unlocking button is always urged in such a direction as to recede from the detent rod.

SUMMARY OF THE DISCLOSURE

However, in the shift lever device described in Japanese Patent Application Publication No. 2000-043600 (JP 2000-043600 A), the cam is always urged in such a direction as to recede from the detent rod. Therefore, a backlash is formed between the cam and the detent rod. Due to the presence of this backlash, a feeling of strangeness may be developed as a result of rapid changes in the operational load of the button at the time of operation. Besides, the waiting position of the detent rod differs depending on whether the parking position or the reverse position is selected. Thus, the amount of backlash fluctuates, and the operation of pressing the unlocking button inward is inconstant. Besides, the unlocking button is urged in the direction opposite to the direction of operation. Thus, the operational load may increase, and an extra force may be required in operating the button of the shift lever. As described hitherto, the aforementioned shift lever device has room of improvement in operational feeling in operating the button.

The disclosure provides a vehicular shift lever device that has a button portion for canceling limitations on changes in shift position and that can improve an operational feeling of button operation in canceling the limitations on the changes in shift position.

A first aspect of the disclosure provides a shift lever device. The shift lever device according to the first aspect includes a shift knob, a rod member including a first portion. The rod member is configured to cancel limitations on changes in a shift position by moving in a first direction. And the shift lever device includes a button portion including a second portion configured to engage the first portion and a button top protruding from the shift knob. The button portion is configured to move the rod member in the first direction by moving in a second direction when the first portion and the second portion are in contact with each other. And the shift lever device includes an urging member. The urging member is configured to urge the button portion such that the second portion approaches the first portion.

In the first aspect of the disclosure, the shift knob may include an urging member retaining portion on which a first end of the urging member abuts. And the button portion may include an abutment portion on which a second end of the urging member abuts.

In the first aspect of the disclosure, the first portion and the second portion may be in contact with each other when the button portion is not operated.

In the first aspect of the disclosure, the urging member may be disposed between the rod member and the button top in the second direction.

According to this aspect of the disclosure, the space of a button hole of the shift knob on the opposite side of the rod member from the button top can be made small. Therefore, an advantage is obtained correspondingly in downsizing the shift knob.

In the first aspect of the disclosure, the button portion may include an accommodation portion that accommodates the urging member, and a groove portion that is entered by the urging member retaining portion.

According to this aspect of the disclosure, the urging member is accommodated in the accommodation portion of the button portion. Therefore, an increase in superfluous space resulting from the urging member can be avoided. Besides, the spring retaining portion enters the groove portion of the button portion. Therefore, an increase in superfluous space resulting from the spring retaining portion can be avoided.

In the first aspect of the disclosure, the button portion may include a button body portion provided with the groove portion, and a button cover portion covering at least part of the button body portion. The button top may be formed on the button cover portion, and at least part of the groove portion may be covered with the button cover portion as viewed from the second direction.

According to this aspect of the disclosure, the groove portion is covered with the button cover portion, and therefore is difficult to see from an operator. Consequently, the shift lever device can be restrained from deteriorating in appearance.

In the first aspect of the disclosure, the urging member may be arranged in a vicinity of a centerline along the second direction of the button top.

According to this aspect of the disclosure, the urging member is located in the vicinity of the center of the button top in the moving direction thereof. Therefore, the button portion can be restrained from being inclined at the time of operation, by making the offset between the direction of the operational load of the button portion and a central axis of the urging member small.

In the first aspect of the disclosure, part of the urging member may be arranged to be located on the centerline.

In the first aspect of the disclosure, an urging force of the urging member in the second direction may be smaller than a reaction force that is received by the button portion from the rod member.

In the first aspect of the disclosure, the urging member may be a spring.

In the first aspect of the disclosure, the first portion may be a first cam portion, and the second portion may be a second cam portion.

In the first aspect of the disclosure, the second cam portion may include an inclined surface that is inclined in the first direction with respect to a direction opposite to the second direction. And a component force in the first direction may be input to the first cam portion to displace the rod member in the first direction when the button portion is displaced in the second direction upon receiving a force in the second direction with the inclined surface being in contact with the first cam portion.

In the first aspect of the disclosure, the first direction and the second direction may be identical in direction.

A second aspect of the disclosure provides a shift lever device. The shift lever device includes a shift knob, a rod member including a first cam portion. The rod member is configured to cancel limitations on changes in a shift position by moving in a first direction. And the shift lever device includes button portion including a second cam portion that engages the first cam portion, and a button top that protrudes from the shift knob. The button portion is configured to move the rod member in the first direction by moving in a second direction. And the shift lever device includes an urging member. The urging member is configured to urge the button portion such that the second cam portion approaches the first cam portion.

According to the second aspect of the disclosure, the urging member urges the button portion such that the second cam portion approaches the first cam portion. Therefore, the operational feeling of button operation can be improved by making the gap between the second cam portion and the first cam portion in a waiting state narrow.

The disclosure makes it possible to provide a vehicular shift lever device that has a button portion for canceling limitations on changes in shift position and that can improve an operational feeling of button operation in canceling the limitations on the changes in shift position.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 11 is a longitudinal sectional view schematically showing a shift lever device according to the second embodiment of the disclosure;

DETAILED DESCRIPTION OF EMBODIMENTS

Figure 1:
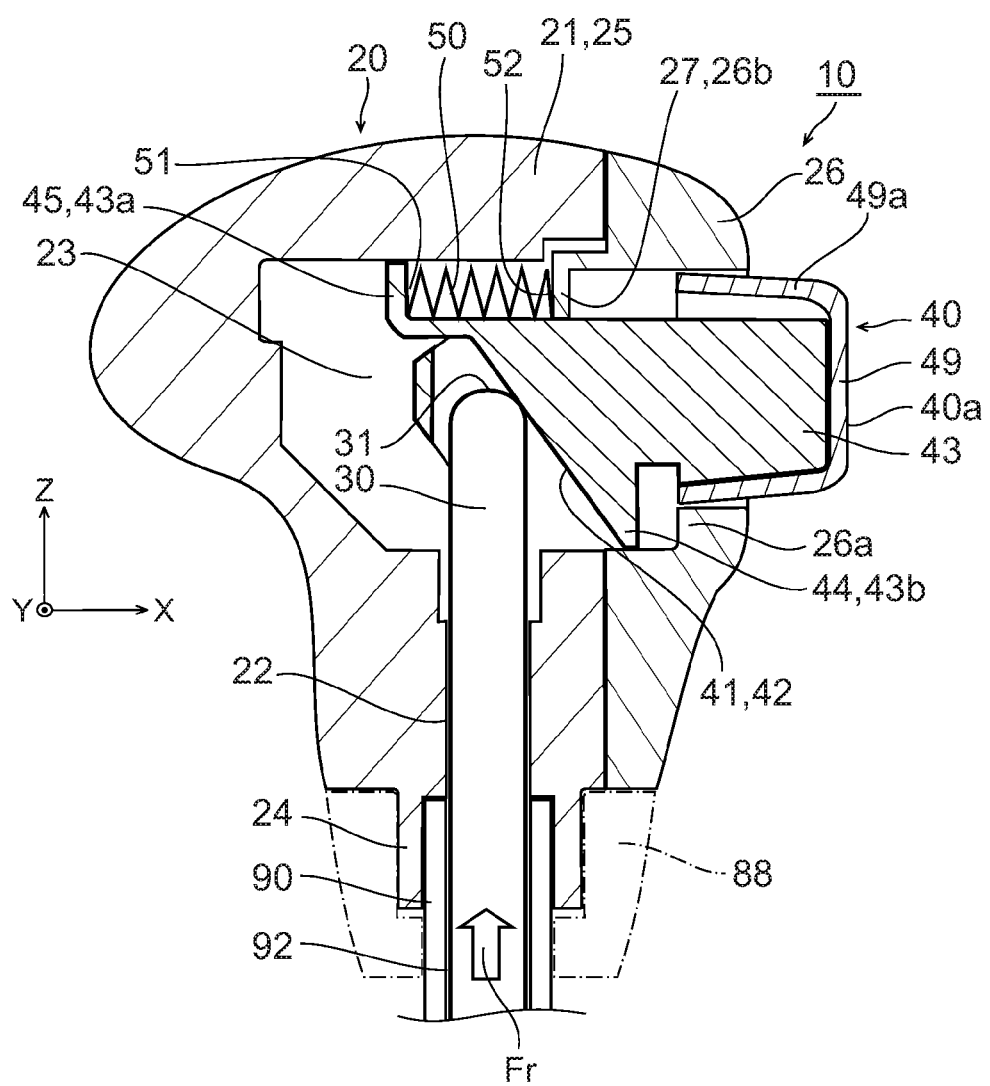
FIG. 1 is a longitudinal sectional view schematically showing a shift lever device according to the first embodiment of the disclosure.

The disclosure will be described hereinafter based on the preferred embodiments thereof, with reference to FIGS. 1 to 14. Identical or equivalent components or members shown in the drawings are denoted by the same reference symbols respectively, and redundant description will be omitted as appropriate. Besides, the dimensions of the members in the respective drawings are shown in an appropriately enlarged or reduced manner for the sake of easy understanding. Besides, some of the members that are not important in describing the embodiments of the disclosure are shown in an omitted manner in the respective drawings.

Figure 2:
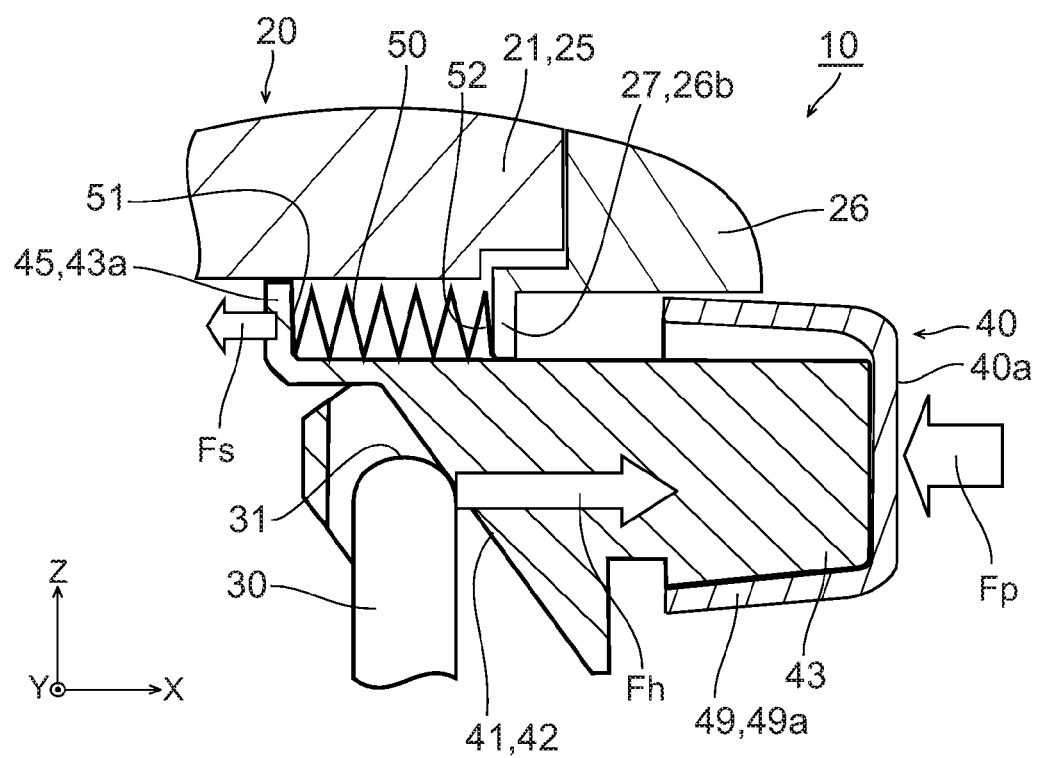
FIG. 2 is a schematic view illustrating the operation of the shift lever device according to the first embodiment of the disclosure.

FIG. 1 schematically shows a shift lever device 10 according to the first embodiment of the disclosure, and FIG. 2 shows, in an enlarged manner, the periphery of a spring member 50 of the shift lever device 10. The following description will be given based on an XYZ-orthogonal coordinate system. A direction X corresponds to a horizontal right-left direction, a direction Y corresponds to a horizontal front-rear direction, and a direction Z corresponds to a vertical up-down direction. Each of the direction Y and the direction Z is orthogonal to the direction X. The direction X may be referred to as a leftward direction or a rightward direction, the direction Y may be referred to as a forward direction or a rearward direction, and the direction Z may be referred to as an upward direction or a downward direction. In FIG. 1, the right side and the left side are referred to as right and left respectively when the shift lever device 10 is viewed from the front.

(Shift Lever Device)

The shift lever device 10 is provided in such a manner as to extend above an automatic transmission of a vehicle. The shift position of the automatic transmission is changed by performing a predetermined operation of the shift lever device 10. The shift position of the automatic transmission of the vehicle includes, for example, a reverse position (hereinafter referred to as an R position) for reversely driving wheels, a neutral position (hereinafter referred to as an N position), and a drive position (hereinafter referred to as a D position) for moving the vehicle forward.

The automatic transmission is provided with a lock mechanism for preventing an erroneous operation resulting from inadvertence, such as a changeover to the R position that is made while the vehicle runs forward, or a changeover to the D position or the R position that is made while the vehicle is parked. The shift lever device 10 is provided with a button portion 40 that unlocks the lock mechanism. The shift lever device 10 is configured not to move in response to the predetermined operation unless a passenger performs the operation while pressing the button portion 40. In particular, the lock mechanism is unlocked through interconnected operation of the button portion 40 and a rod member 30 of the shift lever device 10.

The shift lever device 10 is equipped with a shift knob 20, the rod member 30, the button portion 40 and the spring member 50. The shift knob 20 is provided at one end of a shift shaft 90 that changes the shift position of the automatic transmission of the vehicle. The rod member 30 has a first cam portion 31, and is configured to cancel limitations on changes in the shift position by moving in a first direction. The button portion 40 has a second cam portion 41 that engages the first cam portion 31, and a button top 40a that protrudes from the shift knob 20. The button portion 40 moves the rod member 30 in the first direction by moving in a second direction. The spring member 50 is an urging member for urging the button portion 40. The spring member 50 is provided in such a manner as to urge the button portion 40 such that the second cam portion 41 approaches the first cam portion 31.

(Shift Shaft)

The shift shaft 90 is a pipe-like member whose axial direction extends substantially along the up-down direction. A lower lateral portion of the shift shaft 90 is mechanically coupled to the automatic transmission via coupling means. The shift position of the automatic transmission is operated to be changed in accordance with the turning position (the shift position) of the shift shaft 90 in the front-rear direction (the direction Y). The shift knob 20 as an operational grip is attached to an upper portion of the shift shaft 90. A rod hole 92 that penetrates in the axial direction of the shift shaft 90 (hereinafter referred to simply as the axial direction) is formed at a middle of the shift shaft 90. The rod member 30 for unlocking the lock mechanism is accommodated in the rod hole 92 in such a manner as to be displaceable along the axial direction. The shift shaft 90 may be formed through machining from a metallic pipe material made of, for example, a ferrous material or the like.

(Shift Knob)

The shift knob 20 includes a grip portion 21, a shaft hole portion 22, a button hole portion 23, a lower end portion 24 and a spring retaining portion 27. The grip portion 21 is a member that is gripped by the hand of an operator to be operated. The shaft hole portion 22 is formed in the axial direction, namely, substantially in a longitudinal direction. The button hole portion 23 is formed in a lateral direction. The lower end portion 24 is formed on a lower side of the shift knob 20. A link mechanism that links the shift shaft 90 with the shift knob 20 is provided at the lower end portion 24. The shaft hole portion 22 is a through-hole that is formed in the axial direction from a middle of the grip portion 21. An upper side of the shaft hole portion 22 opens to a lower portion of a lateral surface of the button hole portion 23. The upper portion of the shift shaft 90 is inserted into and fixed to the shaft hole portion 22. The shaft hole portion 22 communicates with the rod hole 92, and surrounds an upper portion of the rod member 30 that protrudes upward from the rod hole 92.

The button hole portion 23 is a bag-like lateral hole that opens on the right direction side of the shift knob 20. The button portion 40 is accommodated in the button hole portion 23 in such a manner as to be displaceable in the right-left direction. A lower portion of the button hole portion 23 communicates with an upper portion of the shaft hole portion 22 in the shift knob 20. In particular, the shift knob 20 includes a knob body portion 25 in which the shaft hole portion 22 and the button hole portion 23 are formed, and a knob cover portion 26 that is fixed in such a manner as to cover part of an opening of the button hole portion 23 of the knob body portion 25. The knob cover portion 26 constitutes a retainer of the button portion 40 that is accommodated in the button hole portion 23 of the knob body portion 25. The knob body portion 25 and the knob cover portion 26 of the shift knob 20 can be formed through molding from, for example, a resinous material, and can be adhesively linked with each other. The lower end portion 24 is provided with the link mechanism for linking the shift shaft 90 with the shift knob 20. The lower end portion 24 may be covered with a cover member 88. The knob cover portion 26 is provided with a stopper portion 26a as a wall portion that covers part of the opening of the button hole portion 23. The stopper portion 26a limits the rightward movement of the button portion 40.

The spring retaining portion 27 is provided at the knob cover portion 26 of the shift knob 20. A fixed end 52 of the spring member 50 abuts on the spring retaining portion 27. The spring retaining portion 27 is provided at a bulge portion 26b that bulges from the knob cover portion 26 into the button hole portion 23.

(Rod Member)

The rod member 30 is a cylindrical rod-like member that extends in the axial direction of the shift shaft 90, and is formed through machining from a metallic rod-like member made of, for example, iron and steel or the like. The first cam portion 31 on an upper side of the rod member 30 protrudes into a middle of the button hole portion 23, and is formed in the shape of a curved surface, for example, a hemispherical surface or the like. A lower portion of the rod member 30 is mechanically coupled to the lock mechanism of the automatic transmission via coupling means. The rod member 30 is urged upward in the axial direction by predetermined urging means. The rod member 30 is displaced to a lower position when the second cam portion 41 of the button portion 40 is pressed inward to the left, and is displaced to an upper position when the second cam portion 41 moves rightward. The lock mechanism is unlocked through displacement of the rod member 30 to the lower position.

(Button Portion)

The button portion 40 is provided to unlock the lock mechanism for preventing an erroneous operation from being performed while the vehicle runs forward or while the vehicle is parked. The button portion 40 includes a button body portion 43 and a button cover portion 49. The button body portion 43 includes the second cam portion 41, a retainer portion 44 and an abutment portion 45. A right portion of the button body portion 43 is a substantially prismatic region that extends in the right-left direction. The button cover portion 49 is a substantially cup-shaped member that covers the right portion of the button body portion 43 from the right side. The button cover portion 49 includes a cylindrical portion 49a that surrounds the button body portion 43, and the button top 40a as a disc-shaped region that blocks one end of the cylindrical portion 49a. The button body portion 43 and the button cover portion 49 are formed through molding from, for example, a resinous material. The button cover portion 49 is fixed to the right portion of the button body portion 43, for example, in an adhesive manner. The retainer portion 44 is a member that limits the slip-out of the button portion 40 from the button hole portion 23. The retainer portion 44 has an engagement portion 43b that protrudes downward at a lower portion of the button body portion 43.

The button portion 40 is accommodated in the button hole portion 23 such that the right portion of the button body portion 43 protrudes from the opening of the button hole portion 23. In this state, the knob cover portion 26 is fixed to the knob body portion 25, so the slip-out of the button portion 40 is limited. That is, when the button portion 40 is displaced in a slip-out direction (rightward), the engagement portion 43b of the button portion 40 comes into abutment on the stopper portion 26a of the knob cover portion 26 to limit further displacement of the button portion 40.

(Cam Portions)

The second cam portion 41 is formed at a middle of the button body portion 43 of the button portion 40. An inclined surface 42 having a right downward gradient is formed on the second cam portion 41. When the button portion 40 receives a leftward pressing force with the inclined surface 42 being in contact with the first cam portion 31, a downward component force is input to the first cam portion 31 that is in contact with the inclined surface 42. As a result, the rod member 30 is displaced downward in such a manner as to correspond to leftward displacement of the button portion 40. When the pressing force is released to displace the button portion 40 rightward, the downward component force applied to the rod member 30 disappears. Then, the rod member 30 is displaced to an upward waiting position, and the button portion 40 is displaced rightward.

The button portion 40 is provided with the abutment portion 45 on which a movable end 51 of the spring member 50 abuts. The abutment portion 45 is provided at a protrusion portion 43a that protrudes upward from a left end portion of the button body portion 43. The spring member 50 is held in a compressed state between the abutment portion 45 and the spring retaining portion 27. A leftward urging force is input to the spring retaining portion 27 due to a restoring force of the spring member 50. As a result, the button portion 40 is urged leftward, namely, in such a direction that the second cam portion 41 approaches the first cam portion 31 of the rod member 30, due to the restoring force of the spring member 50.

(Urging Member)

The spring member 50 is an elastic member that urges the button portion 40 in a predetermined direction. For example, a coil spring can be employed as the spring member 50. The spring member 50 has the fixed end 52 abutting on the bulge portion 26b of the knob cover portion 26, and has the movable end 51 abutting on the protrusion portion 43a of the button body portion 43, in a compressed state. A leftward restoring force is input to the protrusion portion 43a of the button body portion 43 from the movable end 51 of the spring member 50. Therefore, the button portion 40 is urged leftward, namely, in such a direction that the second cam portion 41 approaches the first cam portion 31 of the rod member 30.

(Unlocking Operation)

When the button portion 40 receives a pressing force, a downward component force is input to the first cam portion 31 of the rod member 30, and the rod member 30 is displaced to an unlocking position on the lower side to unlock the lock mechanism. When the pressing force of the button portion 40 is released, the downward component force applied to the rod member 30 disappears, and the rod member 30 is displaced to the upward waiting position to lock the lock mechanism. In the case where the shift position is the D position while the vehicle runs forward or where the shift position is the P position while the vehicle is parked, the rod member 30 has been displaced to the waiting position, and the lock mechanism is locked to make the shift lever device 10 immovable. In this state, when the button portion 40 is pressed inward, the rod member 30 is displaced to the unlocking position to unlock the lock mechanism, and the shift lever device 10 becomes movable. In this state, when the pressing force is released after the shift lever device 10 is moved to a desired shift position, the rod member 30 is displaced to the waiting position to lock the lock mechanism again.

Incidentally, the waiting position of the rod member 30 may differ depending on the shift position. For example, the waiting position of the rod member 30 at the R position may be set below the waiting position of the rod member 30 at the P position. In this case as well, the unlocking position of the rod member 30 is set below the waiting position at each of the shift positions.

Figure 3:
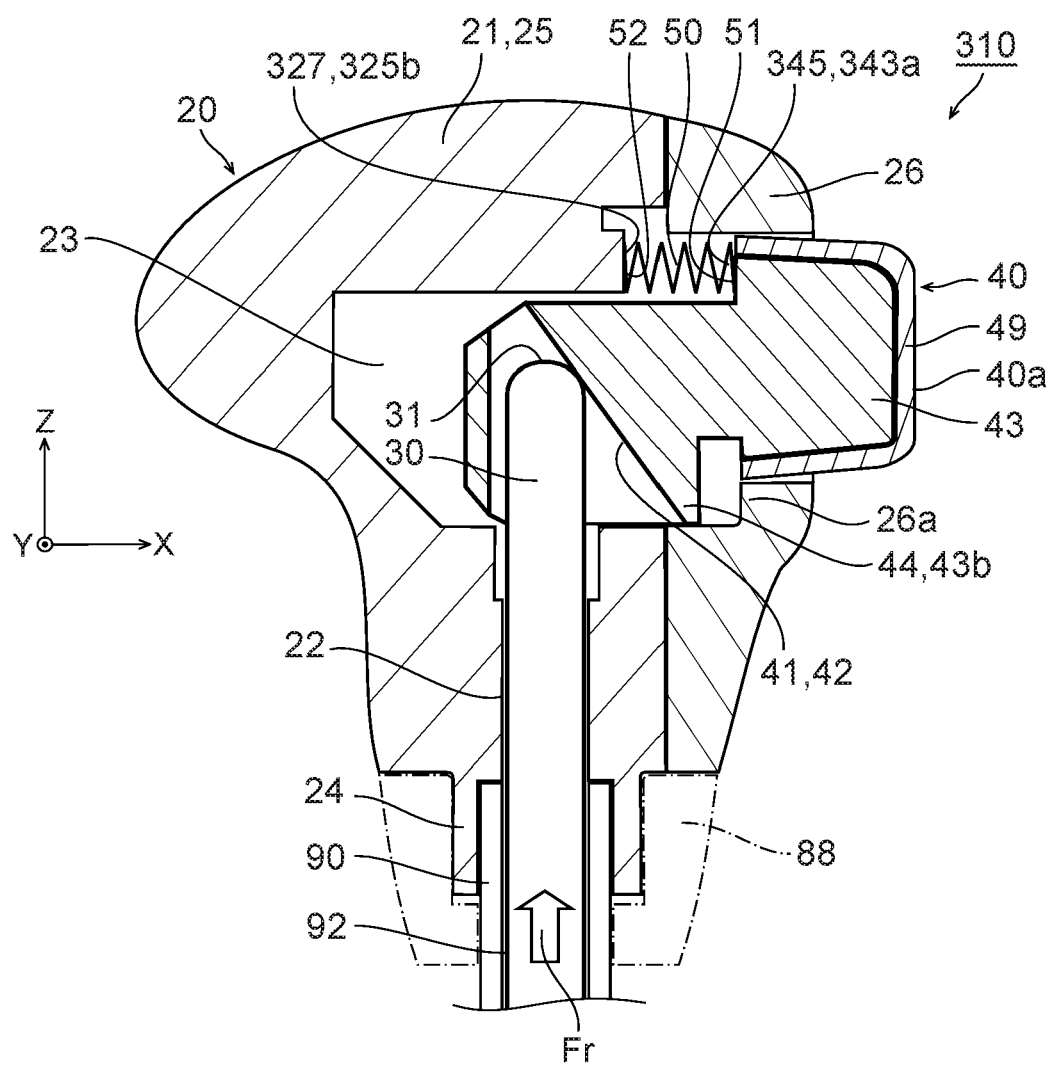
FIG. 3 is a longitudinal sectional view schematically showing a shift lever device according to a comparative example.
Figure 4:
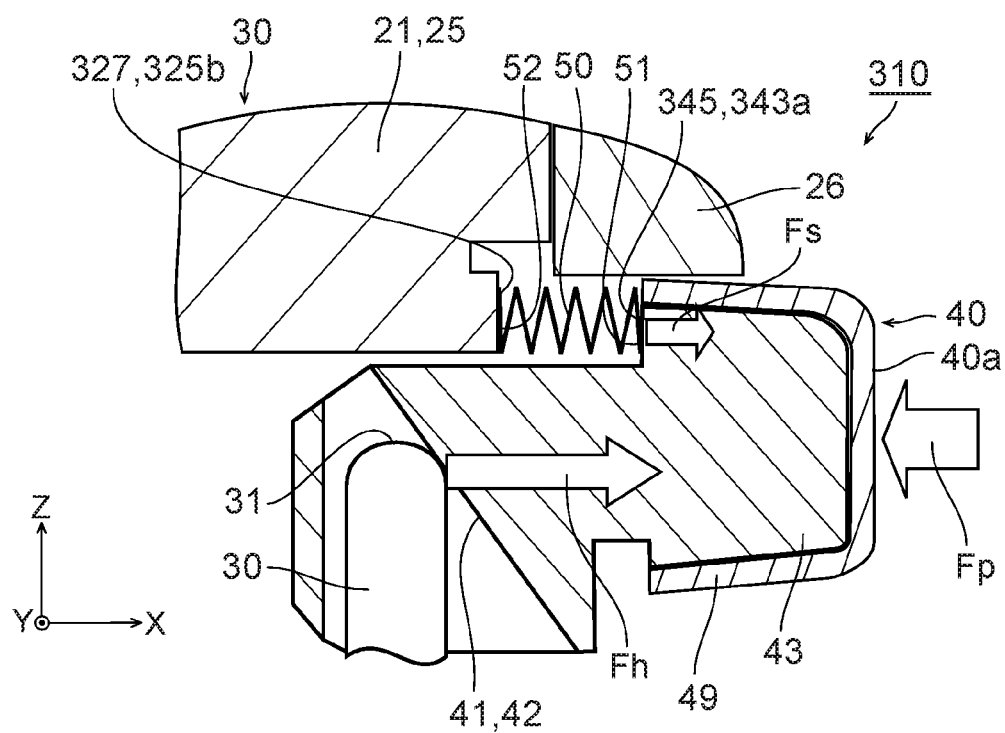
FIG. 4 is a schematic view illustrating the operation of the shift lever device according to the comparative example.

Now, a shift lever device 310 as a comparative example will be described first. FIG. 3 schematically shows the shift lever device 310 as the comparative example, and FIG. 4 shows, in an enlarged manner, the periphery of the spring member 50 of the shift lever device 310. The shift lever device 310 is identical to the shift lever device 10 except in the position where the spring member 50 is disposed and the direction in which the button portion 40 is urged. Thus, redundant description will be omitted.

In the shift lever device 310, a spring retaining portion 327 of a shift knob 320 is provided in a concave portion 325b that is formed on the right side of the knob body portion 25 and that is recessed leftward. An abutment portion 345 of the button portion 40 is provided at a step portion 343a at an upper portion of a button body portion 343. The spring member 50 has the fixed end 52 abutting on the concave portion 325b, and has the movable end 51 abutting on the step portion 343a of the button body portion 343, in a compressed state. A rightward urging force Fs is input to the step portion 343a of the button body portion 43 from the movable end 51 of the spring member 50. Therefore, the button portion 40 is urged rightward, namely, in such a direction that the second cam portion 41 recedes from the first cam portion 31 of the rod member 30.

Figure 5A:
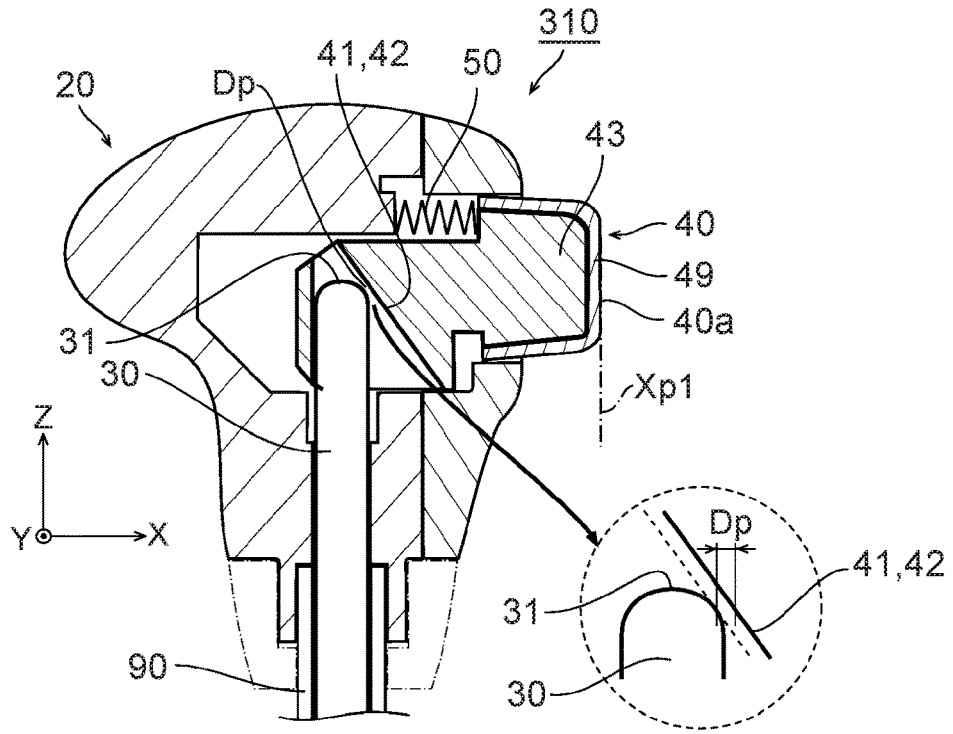
FIG. 5A is a longitudinal sectional view for illustrating a gap between a second cam portion and a first cam portion and a salient margin of a button portion at a P position of the shift lever device according to the comparative example.
Figure 5B:
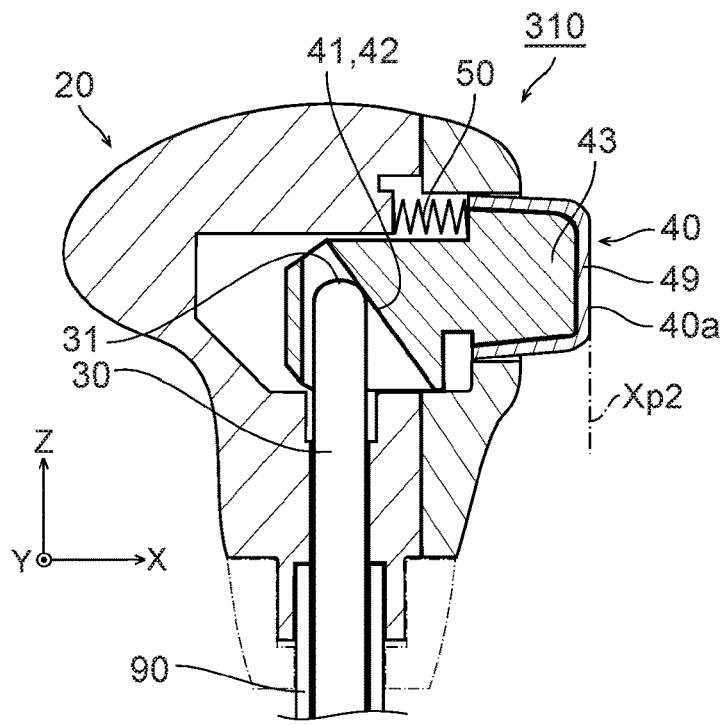
FIG. 5B is a longitudinal sectional view for illustrating the gap between the second cam portion and the first cam portion and the salient margin of the button portion at the P position of the shift lever device according to the comparative example.

Each of FIGS. 5A and 5B is a longitudinal sectional view for illustrating a gap between the second cam portion 41 and the first cam portion 31 and a salient margin of the button portion at the P position of the shift lever device 310 according to the comparative example. FIG. 5A shows a waiting state where the button portion 40 is displaced most rightward. The button portion 40 is in the waiting state when the vehicle is parked or when the vehicle runs normally. FIG. 5B shows a light contact state where the button portion 40 is slightly pressed inward and the second cam portion 41 is in light contact with the first cam portion 31 of the rod member 30. In order to absorb a manufacturing error of each of the members, a gap Dp corresponding to the manufacturing error is set between the second cam portion 41 and the first cam portion 31 in the waiting state. That is, a right end of the button top 40a that protrudes from a button hole of the button portion 40 is located at a position Xp1 in the waiting state, and at a position Xp2 in the light contact state, in the right-left direction. The salient margin of the button portion as a difference between Xp1 and Xp2 corresponds to the gap Dp.

Figure 6A:
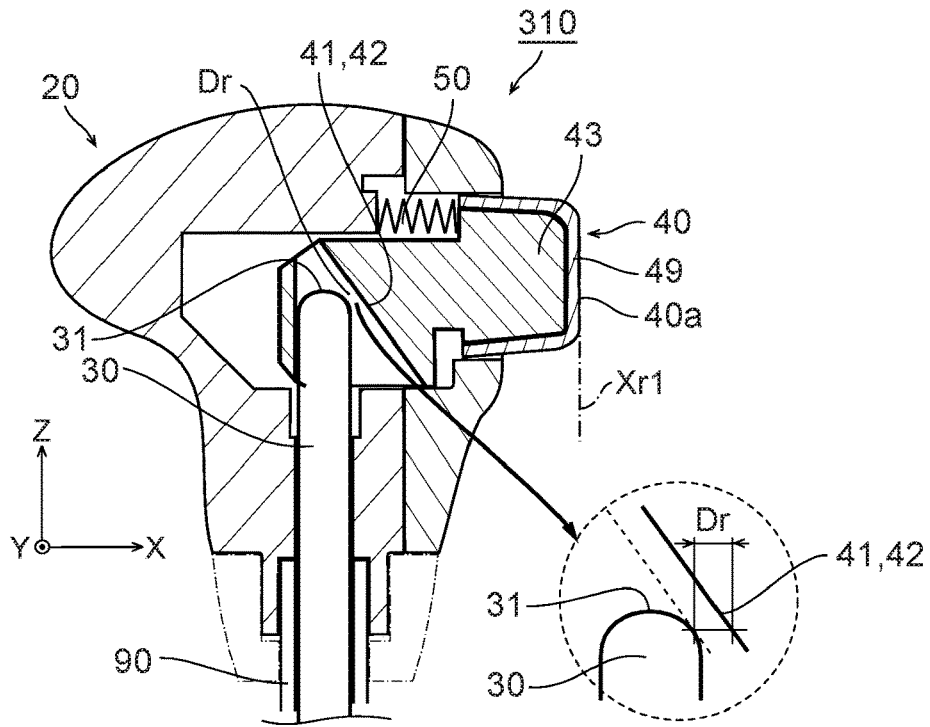
FIG. 6A is a longitudinal sectional view for illustrating a gap between the second cam portion and the first cam portion and a salient margin of the button portion at an R position of the shift lever device according to the comparative example.
Figure 6B:
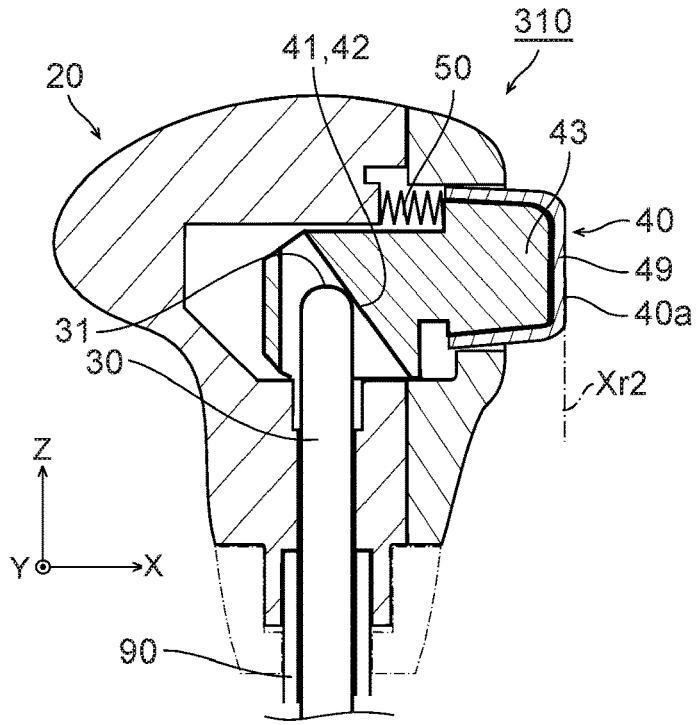
FIG. 6B is a longitudinal sectional view for illustrating the gap between the second cam portion and the first cam portion and the salient margin of the button portion at the R position of the shift lever device according to the comparative example.

Each of FIGS. 6A and 6B is a longitudinal sectional view for illustrating a gap between the second cam portion 41 and the first cam portion 31 and a salient margin of the button portion at the R position of the shift lever device 310 according to the comparative example. FIG. 6A shows a waiting state where the button portion 40 is displaced most rightward. The button portion 40 is in the waiting state when the vehicle is parked or when the vehicle runs normally. FIG. 6B shows a light contact state where the button portion 40 is slightly pressed inward and the second cam portion 41 is in light contact with the first cam portion 31 of the rod member 30.

In order to absorb a manufacturing error of each of the members, a gap Dr corresponding to the manufacturing error is set between the second cam portion 41 and the first cam portion 31 in the waiting state. That is, the right end of the button top 40a of the button portion 40 is located at a position Xr1 in the waiting state, and at a position Xr2 in the light contact state, in the right-left direction. The salient margin of the button portion as a difference between Xr1 and Xr2 corresponds to the gap Dr. In the case where the waiting position of the rod member 30 at the R position is set below the waiting position of the rod member 30 at the P position, the gap Dr at the R position is wider than the gap Dp at the P position.

Figure 7A:
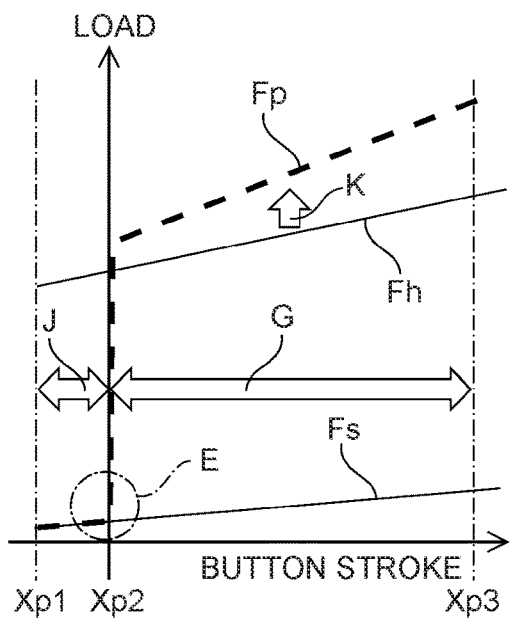
FIG. 7A is a characteristic view showing a relationship between the operation of a button of the shift lever device according to the comparative example and the load applied thereto.
Figure 7B:
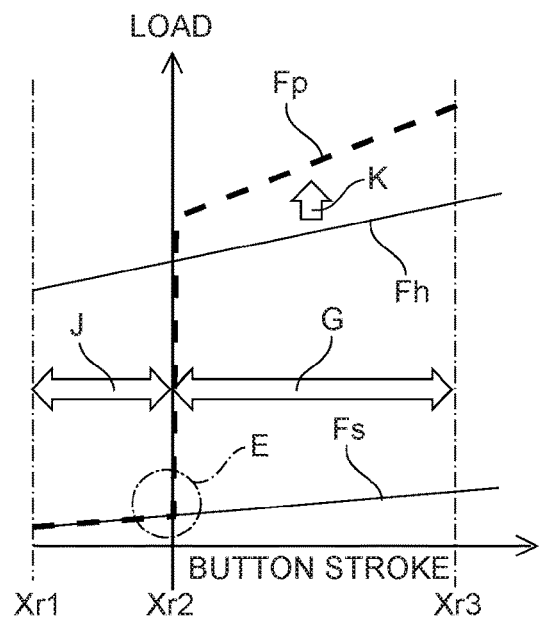
FIG. 7B is a characteristic view showing a relationship between the operation of the button of the shift lever device according to the comparative example and the load applied thereto.

Each of FIGS. 7A and 7B is a characteristic view showing a relationship between the operation of the button portion 40 of the shift lever device 310 according to the comparative example and the load applied thereto. FIG. 7A is a characteristic view at the P position, and FIG. 7B is a characteristic view at the R position. In each of these characteristic views, the axis of abscissa represents the stroke amount of a pressing operation of the button top 40a of the button portion 40, and the axis of ordinate represents an operational load Fp that is received by the button portion 40. Xp1 and Xr1 on the axis of abscissa correspond to the waiting state, Xp2 and Xr2 on the axis of abscissa correspond to the light contact state, and Xp3 and Xr3 on the axis of abscissa correspond to an unlocking state. The operational load Fp of the button portion 40 corresponds to a force obtained by adding a reaction force Fh received from the rod member 30 to the urging force Fs received from the spring member 50.

Over a stroke J from the waiting state to the light contact state, the reaction force Fh is not included in the operational load Fp of the button portion 40. Therefore, the operational load Fp is relatively small. During this period, the stroke J is a so-called backlash resulting from a play margin of the button portion 40. As shown in FIGS. 7A and 7B, the play margin of the button portion 40 is especially large at the R position. The operator may develop an operational feeling that is not exactly comfortable, due to a large play margin of operation and a low degree of moderation feeling. Besides, when the play margin of such an operation is large, the operator performs a correspondingly superfluous operation. From this point of view as well, the operator develops an operational feeling that is not exactly comfortable.

Besides, as shown in FIGS. 7A and 7B, the button stroke includes the low-load stroke J as a backlash as well as a high-load stroke G associated with a substantial operation. The ratio between the low-load stroke J and the high-load stroke G fluctuates depending on whether the P position or the R position is selected. Therefore, the operational feeling depending on the position is inconstant. When the operational feeling fluctuates, the operator may develop a feeling of strangeness for the fluctuations.

Furthermore, when the button portion 40 is pressed inward from the light contact state, the operational load Fp of the button portion 40 corresponds to a force obtained by adding the reaction force Fh to the urging force Fs, and hence rapidly becomes large. That is, as indicated by a circle E, the operational load Fp suddenly changes in steps before and after the light contact state. Due to sudden stepwise changes in the operational load Fp, the operator may develop an operational feeling that is not exactly comfortable.

Besides, the operational load Fp corresponds to a force obtained by adding the reaction force Fh to the urging force Fs. Therefore, as indicated by an arrow K, the operational load Fp is larger than the reaction force Fh. When the operational load Fp is large, the operator applies a correspondingly superfluously large force to the button portion 40. From this point of view as well, the operator may develop an operational feeling that is not exactly comfortable. It is also conceivable that the operational load Fp in this case requires an extra force.

In the light of the foregoing consideration of the shift lever device 310 according to the comparative example, the operation of the shift lever device 10 according to the first embodiment of the disclosure will be described from the standpoint of an improvement in operational feeling.

Figure 8:
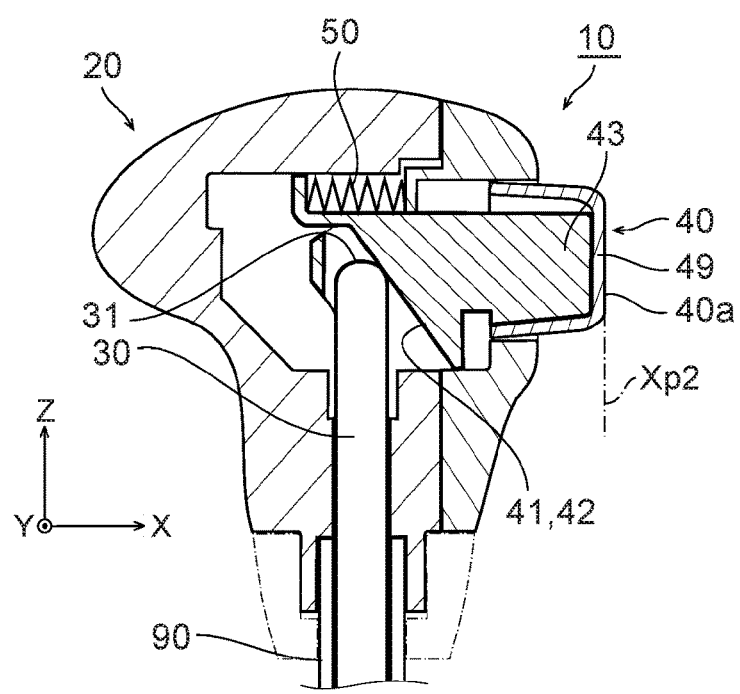
FIG. 8 is a longitudinal sectional view showing a gap between a second cam portion and a first cam portion at a P position of the shift lever device according to the first embodiment of the disclosure.
Figure 9:
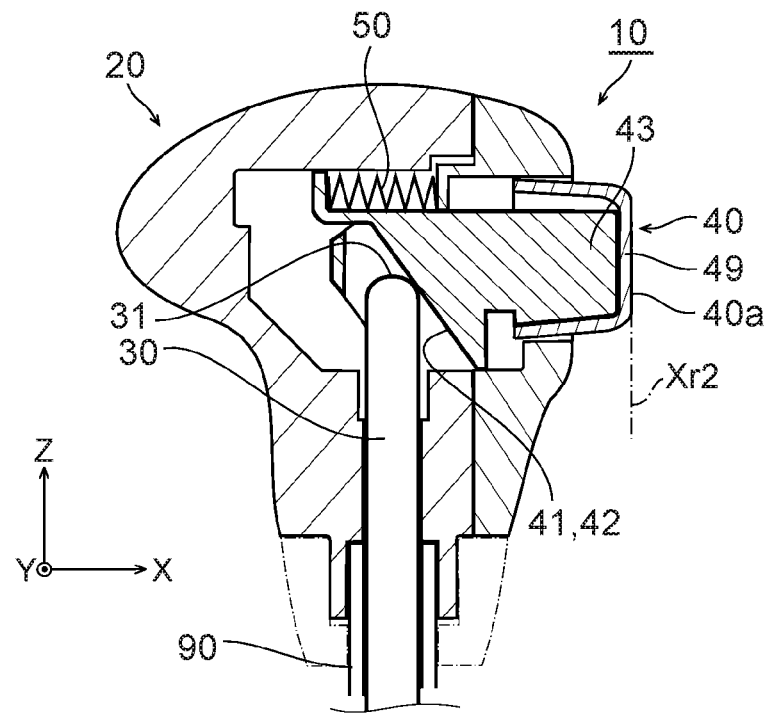
FIG. 9 is a longitudinal sectional view showing a gap between the second cam portion and the first cam portion at an R position of the shift lever device according to the first embodiment of the disclosure.

FIG. 8 is a longitudinal sectional view showing a gap between the first cam portion 31 and the second cam portion 41 at the P position of the shift lever device 10, and FIG. 9 is a longitudinal sectional view showing a gap between the first cam portion 31 and the second cam portion 41 at the R position of the shift lever device 10. As shown in FIG. 8, in the shift lever device 10, the spring member 50 urges the second cam portion 41 leftward, namely, in such a direction as to approach the first cam portion 31. Therefore, in waiting at the P position, the second cam portion 41 is in contact with the first cam portion 31, and no gap is created therebetween. That is, in the shift lever device 10, the light contact state where the second cam portion 41 is in light contact with the first cam portion 31 of the rod member 30 is established, in a waiting state when the vehicle is parked or when the vehicle runs normally. In the shift lever device 10, even in the case where there is a manufacturing error, no superfluous gap is created between the second cam portion 41 and the first cam portion 31.

That is, as shown in FIG. 8, the right end of the button top 40a of the button portion 40 is located at the position Xp2 and does not produce any play margin in waiting at the P position. Besides, as shown in FIG. 9, the right end of the button top 40a of the button portion 40 is located at the position Xr2 and does not produce any play margin in waiting at the R position as well. Therefore, an uncomfortable operational feeling resulting from a play margin can be improved. Besides, due to a small play margin of operation, the operator can avoid performing any superfluous operation. Therefore, the operator can obtain a favorable operational felling from this point of view as well.

Figure 10A:
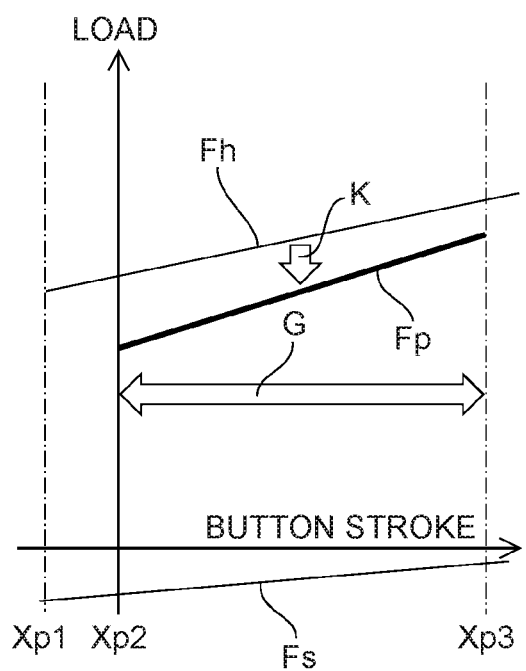
FIG. 10A is a characteristic view showing a relationship between the operation of a button of the shift lever device according to the first embodiment of the disclosure and the load applied thereto.
Figure 10B:
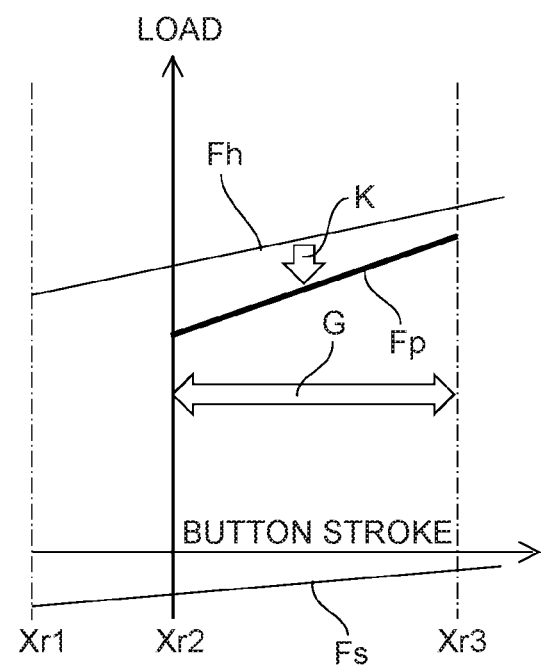
FIG. 10B is a characteristic view showing a relationship between the operation of the button of the shift lever device according to the first embodiment of the disclosure and the load applied thereto.

Each of FIGS. 10A and 10B is a characteristic view showing a relationship between the operation of the button portion 40 of the shift lever device 10 according to the first embodiment of the disclosure and the load applied thereto. FIG. 10A is a characteristic view at the P position, and FIG. 10B is a characteristic view at the R position. In each of these characteristic views, the axis of abscissa represents the stroke amount of a pressing operation of the button top 40a of the button portion 40, and the axis of ordinate represents the operational load Fp that is received by the button portion 40. Xp2 and Xr2 on the axis of abscissa correspond to the light contact state as the waiting state, and Xp3 and Xr3 on the axis of abscissa correspond to the unlocking state. Incidentally, within the range of normal use, the right end of the button top 40a is not located at Xp1 or Xr1.

The operational load Fp of the button portion 40 corresponds to a force obtained by synthesizing the reaction force Fh received from the rod member 30 with the urging force Fs received from the spring member 50. Incidentally, the urging force Fs is a force in the direction opposite to the reaction force Fh. Therefore, the magnitude of the operational load Fp is obtained by subtracting the urging force Fs from the reaction force Fh. That is, as indicated by the arrow K, the operational load Fp is smaller than the reaction force Fh by the urging force Fs. Therefore, an uncomfortable operational feeling resulting from the application of a superfluously large force can be improved.

As shown in FIGS. 10A and 10B, in the shift lever device 10 according to the first embodiment of the disclosure, there is hardly any play margin or superfluous operation of the button portion 40, and the operational feeling can be improved. Besides, the button stroke does not include the low-load stroke J. Therefore, the ratio between the low-load stroke J and the high-load stroke G does not fluctuate depending on whether the P position or the R position is selected, and a feeling of strangeness resulting from fluctuations in operational feeling can be improved. Besides, sudden stepwise changes in the operational load Fp are also avoided.

Second Embodiment

Figure 12:
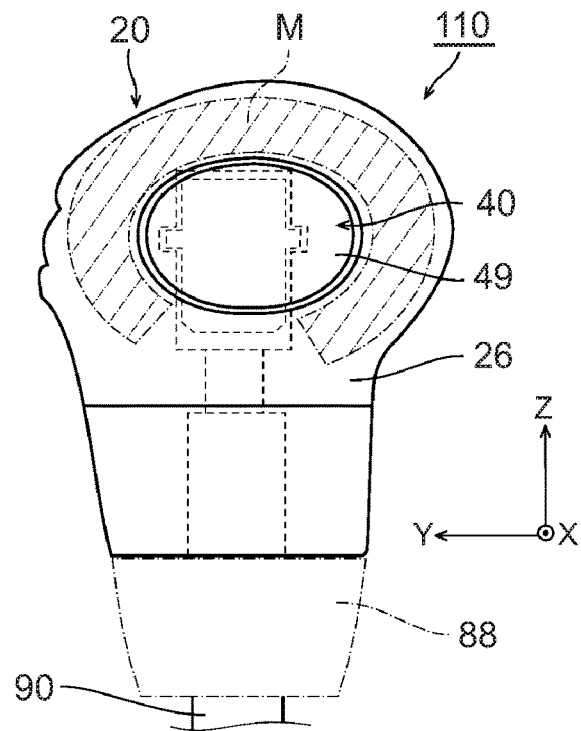
FIG. 12 is a right lateral view of the shift lever device according to the second embodiment of the disclosure.

Next, a shift lever device 110 according to the second embodiment of the disclosure will be described. FIG. 11 is a longitudinal sectional view schematically showing the shift lever device 110, and FIG. 12 is a right lateral view of the shift lever device 110. The shift lever device 110 is identical to the shift lever device 10 except in that the contour of the shift knob 20 is downsized and that a different mode of supporting the spring member 50 is adopted. Thus, redundant description will be omitted.

In the shift lever device 110, the movable end 51 of the spring member 50 is supported by the abutment portion 45 of the button portion 40, and the fixed end 52 of the spring member 50 is supported by the spring retaining portion 27 of the shift knob 20. In the shift lever device 110, the abutment portion 45 is provided at a protrusion portion 43c that protrudes upward from a middle of the button body portion 43. The protrusion portion 43c of the shift lever device 110 is provided on the right side of the protrusion portion 43a of the shift lever device 10. In the shift lever device 110, the spring retaining portion 27 is provided on a wall portion 26c at an upper left portion of the knob cover portion 26 of the shift knob 20. In particular, the protrusion portion 43c of the shift lever device 110 is provided on the right side of a left end of the rod member 30. Due to the adoption of this configuration, the space of the button hole portion 23 of the shift knob 20 on the left side of the rod member 30 can be made small. Therefore, the shift knob 20 can be downsized in the right-left direction correspondingly.

In the shift lever device 110, the spring member 50 inputs a leftward urging force to the protrusion portion 43c. Therefore, the second cam portion 41 of the button portion 40 is urged leftward, namely, in such a direction as to approach the first cam portion 31 of the rod member 30. Accordingly, it is obvious that the shift lever device 110 has features similar to those of the shift lever device 10.

As shown in FIG. 12, in the shift lever device 110, the protrusion portion 43c for providing the abutment portion 45 can be provided in a range M that does not include a range occupied by the second cam portion 41 and that surrounds the button portion 40.

Third Embodiment

Figure 13:
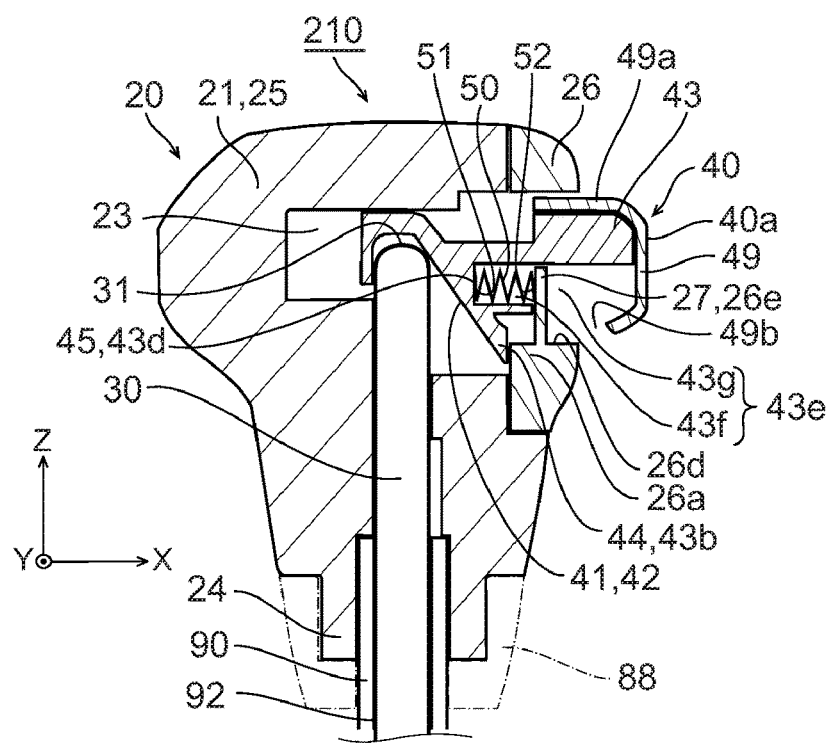
FIG. 13 is a longitudinal sectional view schematically showing a shift lever device according to the third embodiment of the disclosure.
Figure 14:
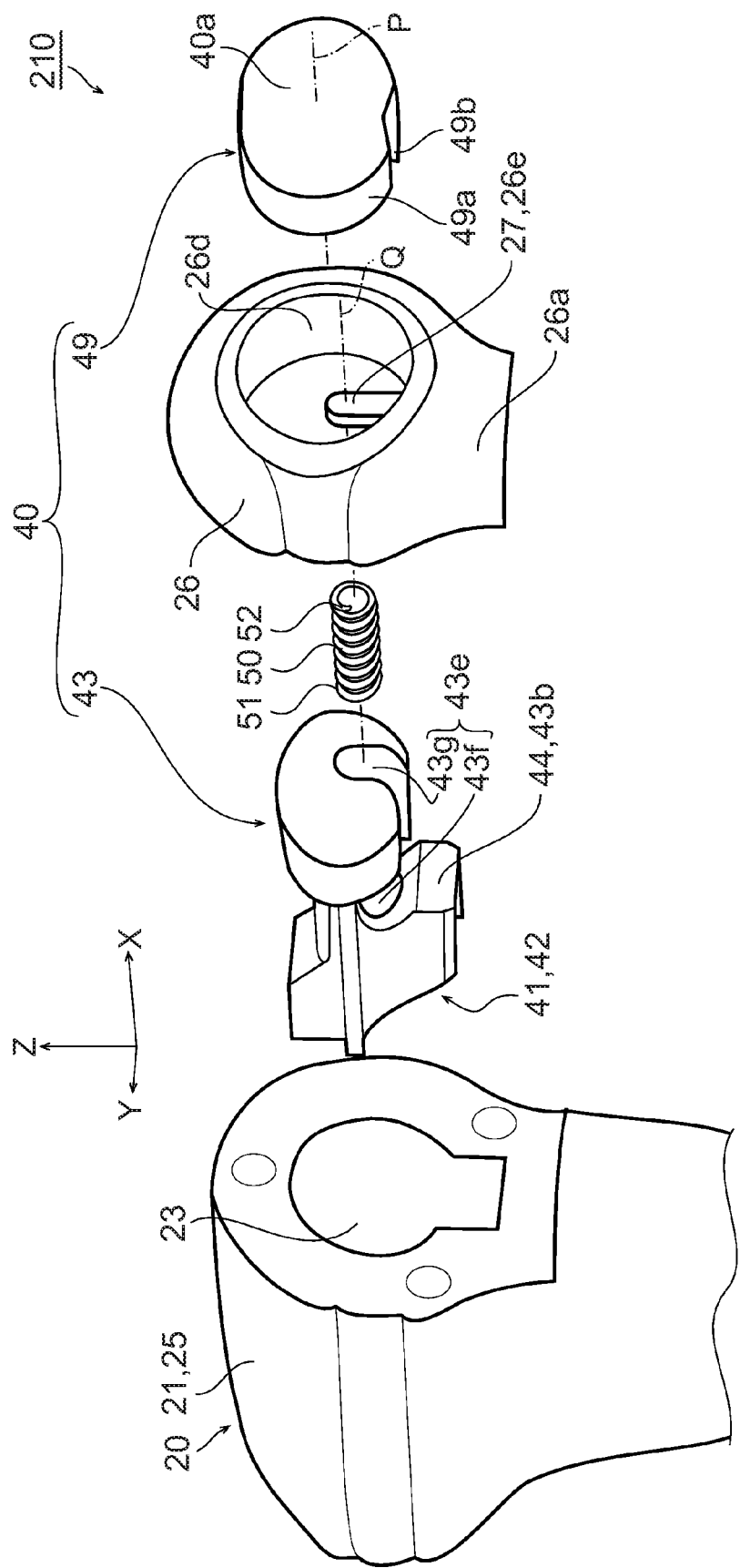
FIG. 14 is an exploded view showing, in an exploded manner, the periphery of an urging member of the shift lever device according to the third embodiment of the disclosure.

Next, a shift lever device 210 according to the third embodiment of the disclosure will be described. FIG. 13 is a longitudinal sectional view schematically showing the shift lever device 210, and FIG. 14 is an exploded perspective view of the shift lever device 210. The shift lever device 210 is identical to the shift lever device 110 except in that a different mode of supporting the spring member 50 is adopted. Thus, redundant description will be omitted. In particular, the spring member 50 of the shift lever device 210 is disposed between the rod member 30 and the button top 40a in the right-left direction as the second direction.

In the shift lever device 210, the movable end 51 of the spring member 50 is supported by the abutment portion 45 of the button portion 40, and the fixed end 52 of the spring member 50 is supported by the spring retaining portion 27 of the shift knob 20. The button portion 40 is provided with a spring hole 43f and a spring groove 43g that is entered by the spring retaining portion 27, in an accommodation portion 43e that accommodates the movable end 51 side of the spring member 50. In the shift lever device 210, the abutment portion 45 is provided at a bottom portion 43d of the accommodation portion 43e that is provided at the middle of the button body portion 43. The accommodation portion 43e includes the spring hole 43f and the spring groove 43g, which extend in the right-left direction. The spring groove 43g is provided on the right side of the spring hole 43f. The cross-section of the spring hole 43f in a right view is substantially circularly formed. The bottom portion 43d is formed at a left portion of the spring hole 43f, and an opening is formed at a right portion of the spring hole 43f. The spring groove 43g is formed in the shape of inverted U whose lower side is open in a right view. A left portion of the spring groove 43g communicates with the spring hole 43f, and an opening is formed at a right portion of the spring groove 43g. The spring member 50 is inserted in the spring hole 43f with the movable end 51 located at the top. The fixed end 52 protrudes from the opening of the spring hole 43f, and is accommodated in the spring groove 43g.

In particular, the accommodation portion 43e that accommodates the spring member 50 is provided between the rod member 30 and the button top 40a in the right-left direction as the second direction.

In the shift lever device 210, the spring retaining portion 27 is provided at a convex portion 26e that extends inward from an inner periphery of an opening portion 26d of the knob cover portion 26 of the shift knob 20. The opening portion 26d is formed substantially in the shape of an ellipse that is slightly larger than the contour of the button cover portion 49 in a rightward view. The button cover portion 49, with which the button body portion 43 is covered, is inserted through the opening portion 26d. The convex portion 26e extends upward from a lower portion of the opening portion 26d, and enters the spring groove 43g. The convex portion 26e supports the fixed end 52 of the spring member 50, which protrudes from the spring hole 43f, in the spring groove 43g. The convex portion 26e is formed with a width that is slightly smaller than the groove width of the spring groove 43g. The convex portion 26e is provided such that the relative position thereof in the right-left direction can change inside the spring groove 43g.

In the shift lever device 210, the button cover portion 49 is provided with a cover groove portion 49b for avoiding the interference with the convex portion 26e. The cover groove portion 49b is extended along the right-left direction at a lower left portion of the cylindrical portion 49a of the button cover portion 49 and below the spring groove 43g. The cover groove portion 49b is formed with a groove width that is slightly larger than the width of the convex portion 26e and that is substantially equal to the groove width of the spring groove 43g. The cover groove portion 49b is formed such that the relative position of the convex portion 26e can change in the right-left direction inside the cover groove portion 49b. The convex portion 26e also enters the interior of the cover groove portion 49b. Therefore, the range where the relative position of the convex portion 26e changes can be enlarged to the interior of the cover groove portion 49b as well as the spring groove 43g. Besides, the internal structures of the cover groove portion 49b, the spring groove 43g, and the like are substantially covered with the button top 40a of the button cover portion 49, and hence is outside a normal visible range of the operator. Thus, the influence on the appearance is not great.

In the shift lever device 210, the spring member 50 inputs a leftward urging force to the bottom portion 43d. Therefore, the second cam portion 41 of the button portion 40 is urged in such a direction as to approach the first cam portion 31 of the rod member 30. Accordingly, it is obvious that the shift lever device 210 has features similar to those of the shift lever device 10.

In addition, the accommodation portion 43e in which the spring member 50 is accommodated is provided on the right side of the rod member 30 in the second direction. Therefore, the space of the button hole portion 23 of the shift knob 20 on the left side of the rod member 30 is made small. As a result, an advantage is obtained correspondingly in downsizing the shift knob 20.

Besides, the spring member 50 is accommodated inside the button body portion 43. Therefore, a greater advantage is obtained in downsizing the shift knob 20 than in the case where a space where the spring member 50 is arranged is provided outside the button body portion 43. That is, an increase in superfluous space resulting from the spring member 50 can be avoided.

Besides, the spring member 50 is accommodated inside the button body portion 43, so the spring member 50 is arranged in the vicinity of a centerline P in the moving direction of the button top 40a. In particular, a central axis Q of the spring member 50 is located in the vicinity of the centerline P. Therefore, the offset between the direction of the operational load of the button portion 40 and the central axis Q of the spring member 50 is smaller than in the case where the central axis Q of the spring member 50 is located outside the button body portion 43, and the button portion 40 can be restrained from being inclined at the time of operation. Incidentally, the centerline P in the moving direction of the button top 40a means a line that extends along the right-left direction and that passes through a center as an intersection point of a line bisecting the button top 40a in the front-rear direction and a line bisecting the button top 40a in the up-down direction when the moving direction of the button portion 40 is made to coincide with the right-left direction.

The spring member 50 may be arranged such that the central axis Q thereof is located on the centerline P in the moving direction of the button portion 40. The spring member 50 may be arranged such that the centerline P passes through the spring member 50. The spring member 50 may be arranged such that the central axis Q thereof passes through the button top 40a.

Next, the operation of the accommodation portion 43e, the convex portion 26e and the cover groove portion 49b of the shift lever device 210 will be described. First of all, in the waiting state, the fixed end 52 of the spring member 50 that is accommodated in the accommodation portion 43e is retained by the spring retaining portion 27 of the convex portion 26e that enters the interior of the spring groove 43g across the cover groove portion 49b. In this state, the bottom portion 43d of the spring hole 43f is urged leftward by the movable end 51. Thus, the second cam portion 41 remains in contact with the first cam portion 31.

It should be noted herein that when the button portion 40 is displaced upon receiving a leftward pressing force, the rod member 30 is displaced downward by the second cam portion 41 and the first cam portion 31 to unlock the lock mechanism. On this occasion, the convex portion 26e moves relatively rightward inside the spring groove 43g across the cover groove portion 49b.

When the pressing force is released to displace the button portion 40 rightward, the downward component force applied to the rod member 30 disappears, and the rod member 30 is displaced to the upward waiting position to lock the lock mechanism.

Next, the features of the shift lever device 210 will be described. In the shift lever device 210, the spring member 50 performs an urging operation such that the second cam portion 41 approaches the first cam portion 31. Therefore, the operational feeling of button operation can be improved by making the gap between the second cam portion 41 and the first cam portion 31 in the waiting state narrow.

In the shift lever device 210, the spring member 50 is disposed between the rod member 30 and the button top 40a in the second direction. Therefore, the space of the button hole portion 23 of the shift knob 20 on the opposite side of the button top 40a of the rod member 30 can be made small, and an advantage is obtained correspondingly in downsizing the shift knob 20.

In the shift lever device 210, the shift knob 20 is provided, at the convex portion 26e, with the spring retaining portion 27 on which the fixed end 52 of the spring member 50 abuts, and the button portion 40 is provided with the accommodation portion 43e that accommodates the movable end 51 side of the spring member 50, and the spring groove 43g that is entered by the spring retaining portion 27. Therefore, an increase in superfluous space resulting from the spring member 50 can be avoided, and an increase in superfluous space for the spring retaining portion 27 can be avoided.

In the shift lever device 210, the button portion 40 includes the button body portion 43 that is provided with the spring groove 43g, and the button cover portion 49 that covers at least part of the button body portion 43 and that has the button top 40a formed thereon. At least part of the spring groove 43g is covered with the button cover portion 49 as viewed from an outer right side. Therefore, the spring groove 43g is covered with the button cover portion 49 and is difficult to see from the operator. As a result, the shift lever device 210 can be restrained from deteriorating in appearance.

In the shift lever device 210, the spring member 50 is arranged in the vicinity of the centerline P along the right-left direction of the button top 40a. Therefore, the button portion 40 can be restrained from being inclined at the time of operation, by making the offset between the direction of the operational load of the button portion 40 and the central axis Q of the spring member 50 small.

In each of the aforementioned embodiments of the disclosure, the button portion 40 may be configured such that the left direction thereof or the upward direction thereof coincides with the direction in which the button portion 40 slips out. Besides, in each of the aforementioned embodiments of the disclosure, when the upward direction of the button portion 40 coincides with the direction in which the button portion 40 slips out, the shift lever device 210 may not include the first cam portion 31 and the second cam portion 41, and the button portion 40 may come into contact with the rod member 30 and move downward so that the rod member 30 is pressed down and displaced to the lower position.

The disclosure has been described above based on the embodiments thereof. It is understood by those skilled in the art that these embodiments of the disclosure are exemplifications, that various modifications and alterations are possible within the scope of the claims of the disclosure, and that such modifications and alterations also fall within the claims. Accordingly, the description and drawings in the present specification should be treated in a demonstrative manner instead of being treated in a limitative manner.

In the drawings used for illustration, the cross-sections of some of the members are hatched for the purpose of clarifying the relationship among the members. However, this hatching does not limit the materials or material qualities of these members.

What is claimed is:

1. A shift lever device comprising:
a shift knob including an urging member retaining portion;
a rod member including a first portion, the rod member being configured such that displacement of the rod member in a first direction permits changes in a shift position;
a button portion including an abutment portion, a second portion, and a button top protruding from the shift knob, the second portion being configured to engage the first portion and the button portion being configured such that, by moving in a second direction, the button portion causes the rod member to move in the first direction; and
an urging member configured to urge the second portion of the button portion toward the first portion, the urging member comprising a first end which abuts the urging member retaining portion and a second end which abuts the abutment portion, wherein
the urging member retaining portion is located between the abutment portion and the button top in the second direction; and
the rod member is located between the abutment portion and the urging member retaining portion in the second direction.

2. The shift lever device according to claim 1, wherein the first portion and the second portion are in contact with each other when the button portion has not moved in the second direction.

3. The shift lever device according to claim 1, wherein an urging force of the urging member in the second direction is smaller than a reaction force that is received by the button portion from the rod member.

4. The shift lever device according to claim 1, wherein the urging member is a spring.

5. The shift lever device according to claim 1, wherein the first portion is a first cam portion, and the second portion is a second cam portion.

6. The shift lever device according to claim 5, wherein the second cam portion includes an inclined surface that is inclined in the first direction with respect to a direction opposite to the second direction, and
a component force in the first direction is input to the first cam portion to displace the rod member in the first direction when the button portion is displaced in the second direction upon receiving a force in the second direction with the inclined surface being in contact with the first cam portion.

7. A shift lever device comprising:
a shift knob including an urging member retaining portion;
a rod member including a first cam portion, the rod member permitting changes in a shift position when displaced in a first direction;
a button portion including an abutment portion, a second cam portion that engages the first cam portion, and a button top that protrudes from the shift knob, the button portion being configured such that, by moving in a second direction, the button portion causes the rod member to move in the first direction; and
an urging member configured to urge the second cam portion of the button portion toward the first cam portion, the urging member comprising a first end which abuts the urging member retaining portion and a second end which abuts the abutment portion, wherein
the urging member retaining portion is located between the abutment portion and the button top in the second direction; and
the rod member is located between the abutment portion and the urging member retaining portion in the second direction.

* * * * *